(12) United States Patent
Krug et al.

(10) Patent No.: US 10,838,230 B2
(45) Date of Patent: *Nov. 17, 2020

(54) METHOD FOR MAKING A SPECTACLE LENS

(71) Applicant: Carl Zeiss Vision International GmbH, Aalen (DE)

(72) Inventors: Herbert Krug, Aalen (DE); Timo Kratzer, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 18 days.

This patent is subject to a terminal disclaimer.

(21) Appl. No.: 16/197,234

(22) Filed: Nov. 20, 2018

(65) Prior Publication Data

US 2019/0086692 A1 Mar. 21, 2019

Related U.S. Application Data

(63) Continuation of application No. 14/697,338, filed on Apr. 27, 2015, now Pat. No. 10,247,960, which is a (Continued)

(30) Foreign Application Priority Data

May 27, 2010 (DE) .......................... 10 2010 021 763

(51) Int. Cl.
*G02C 7/02* (2006.01)
*G02C 7/06* (2006.01)

(52) U.S. Cl.
CPC .............. *G02C 7/027* (2013.01); *G02C 7/024* (2013.01); *G02C 7/025* (2013.01); *G02C 7/06* (2013.01); *G02C 7/066* (2013.01)

(58) Field of Classification Search
CPC ........ G02C 7/027; G02C 7/024; G02C 7/025; G02C 7/06; G02C 7/066; G02C 7/10; G02C 7/02; G02C 7/028
See application file for complete search history.

(56) References Cited

U.S. PATENT DOCUMENTS 4,253,747 A 3/1981 Maitenaz
5,805,263 A 9/1998 Reymondet et al.
(Continued)

OTHER PUBLICATIONS

English translation and Office action of the European Patent Office dated Mar. 15, 2019 in corresponding European patent application 11715920.2.
(Continued)

*Primary Examiner* — Jordan M Schwartz
(74) *Attorney, Agent, or Firm* — Walter Ottesen, P.A.

(57) ABSTRACT

The invention is directed to a method for making a spectacle lens for a non-presbyopic person wherein the spectacle lens is a ready-to-wear lens and has at least one zone having an optical effect to reduce vision stress. In the method, at least one of the following is provided: the contour of the ready-to-wear spectacle lens and one or several visual points whereat the person looks through the ready-to-wear spectacle lens for one or several visual tasks in the near range. This method step is followed by setting at least one of: a design reference point of the zone, the extent of the zone, the optical effect within the zone based on the provided contour, and the visual points. The spectacle lens is then made with this zone.

10 Claims, 9 Drawing Sheets

Related U.S. Application Data continuation of application No. 13/685,845, filed on Nov. 27, 2012, now Pat. No. 9,063,348, which is a continuation of application No. PCT/EP2011/056382, filed on Apr. 20, 2011.

(56) References Cited

U.S. PATENT DOCUMENTS

| | | | |
|---|---|---|---|
| 6,343,861 | B1 | 2/2002 | Kris et al. |
| 6,655,802 | B2 | 12/2003 | Zimmermann et al. |
| 6,709,101 | B1 | 3/2004 | Lee |
| 7,207,675 | B1 | 4/2007 | Chauveau et al. |
| 7,216,977 | B2 | 5/2007 | Poulain et al. |
| 7,364,292 | B2 | 4/2008 | Kato |
| 7,540,610 | B2 | 6/2009 | Carimalo et al. |
| 8,002,405 | B2 | 8/2011 | Wolfgang et al. |
| 10,247,960 | B2 * | 4/2019 | Krug .................. G02C 7/027 |
| 2007/0159601 | A1 | 7/2007 | Ho et al. |
| 2008/0297721 | A1 | 12/2008 | Gupta et al. |
| 2009/0002627 | A1 | 1/2009 | Katz |
| 2010/0149485 | A1 | 6/2010 | Torrey |
| 2010/0296055 | A1 | 11/2010 | Esser et al. |
| 2012/0008090 | A1 * | 1/2012 | Atheimer .............. G02C 7/025 351/159.75 |
| 2012/0105801 | A1 * | 5/2012 | Yamakaji .............. G02C 7/025 351/159.76 |

OTHER PUBLICATIONS

English translation and second Office action of the German Patent Office dated May 21, 2019 in German patent application 10 2010 021 763.8 on which the claim of priority is based.

English translation and Office action of the European Patent Office dated Jun. 4, 2018 in the corresponding European patent application 11715920.2.

DIN EN ISO 13666: 2012, "Ophthalmic optics-Spectacle lenses", DIN Deutschen Institut fuer Normung, e.V., pp. 1 to 110.

DIN EN ISO 58208, "Ophthalmic optics-Definitions and symbols of spectacle lenses in connection with the human eye", DIN Deutschen Institut fuer Normung, e.V., pp. 1 to 9, Oct. 2013.

Keeney, A. et al, "Dictionary of Ophthalmic Optics", 1995, Butterworth-Heinemann, Newton, MA, pp. 172 and 173.

International Search Report dated Jul. 12, 2011 of international application PCT/EP2011/056382 on which this application is based.

English translation and Office action of the German Patent Office dated Oct. 7, 2010 in German patent application 10 2010 021 763.8 on which the claim of priority is based.

English translation of the Office action of the Chinese Patent Office dated Oct. 21, 2013 in the corresponding Chinese patent application 201180026241.8.

English translation of the Written Opinion of the international searching authority dated Dec. 6, 2012 in international patent application PCT/EP2011/056382 on which the claim of priority is based.

English translation of the second Office action of the Chinese Patent Office dated Aug. 28, 2014 in the corresponding Chinese patent application 201180026241.8.

* cited by examiner

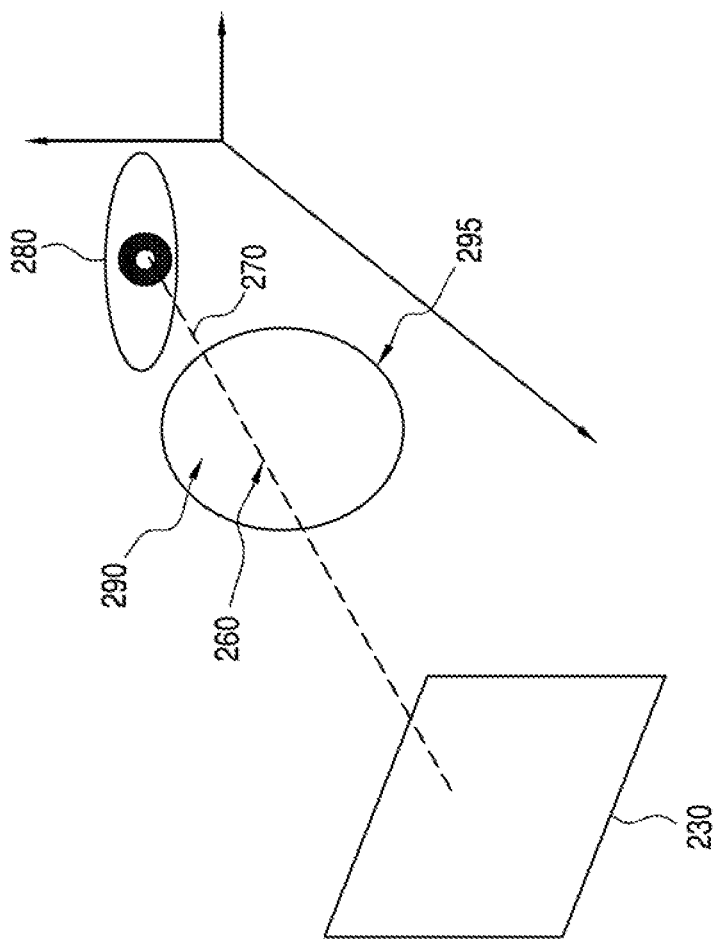

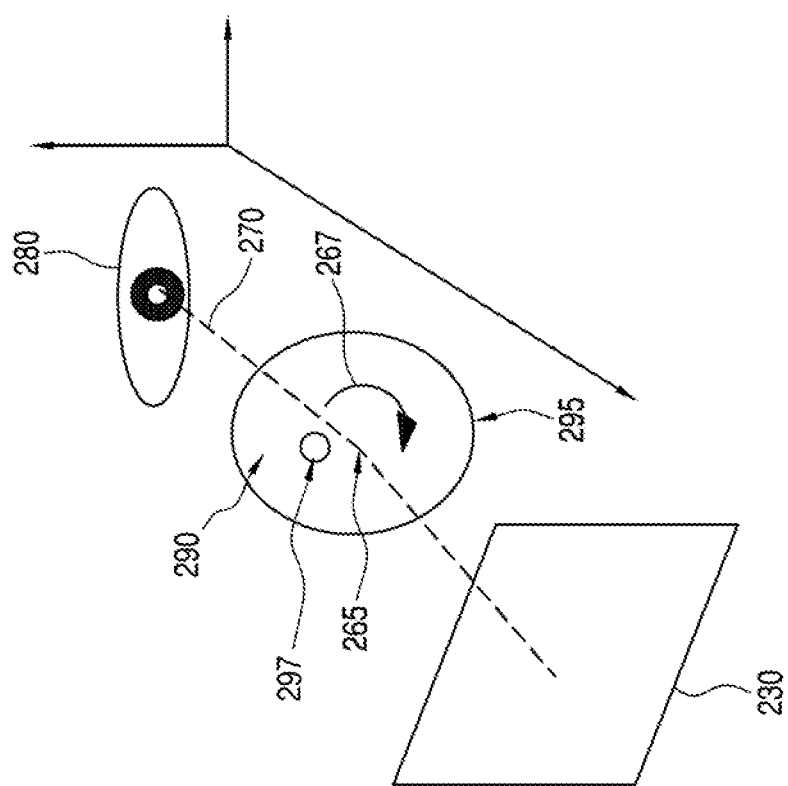

METHOD FOR MAKING A SPECTACLE LENS

CROSS REFERENCE TO RELATED APPLICATIONS

This application is a continuation application of patent application Ser. No. 14/697,338, filed Apr. 27, 2015, which is, in turn, a continuation application of patent application Ser. No. 13/685,845, filed Nov. 27, 2012 (now U.S. Pat. No. 9,063,348, issued Jun. 23, 2015), which is, in turn, a continuation application of international patent application PCT/EP2011/056382, filed Apr. 20, 2011, designating the United States and claiming priority from German application 10 2010 021 763.8, filed May 27, 2010, and the entire content of all the above applications is incorporated herein by reference.

BACKGROUND OF THE INVENTION

A study carried out in France, the USA and Japan on 2760 persons aged between 20 and 45 has indicated that 60% of the population suffers from eye fatigue. The eyes of persons affected by eye fatigue can no longer be set to an optimal sharpness and the ability of these persons to focus reduces. This leads to blurry vision and strain discomfort. This strain discomfort in particular occurs in the case of stress, artificial light, long periods of work in front of a computer, et cetera. The cause of this discomfort is an ever increasing load in the near range which occurs over a relatively long period of time.

Various spectacles lens manufacturers have identified this problem and offer specially designed spectacles lenses for non-presbyopic persons. Under the "Anti-Fatigue" brand, Essilor offers spectacles lenses, the near portion of which has an increased power of +0.60 D compared to an afocal lens or a conventional single vision lens. This increased near portion power has an accommodation-supporting power so as to reduce accommodation stress in the case of visual tasks in the near range. Such a spectacles lens is also described in U.S. Pat. No. 7,540,610 B2. It is also known to provide a convergence support in the form of an increased prismatic power in the near portion in order to reduce the convergence stress in the case of visual tasks in the near range. Combinations of both supporting measures are also possible.

Even though, in principle, the aforementioned visual stress-reducing spectacles lenses have proven their worth, a large proportion of non-presbyopic persons who wear spectacles with the above-described visual stress-reducing spectacles lenses were found nevertheless to complain about eye fatigue.

SUMMARY OF THE INVENTION

Thus, an object of the invention is to provide a method for making a spectacles lens, by means of which further improved spectacles lenses with visual stress-reducing effect can be produced. It is also an object of the invention to provide an improved spectacles lens for reducing visual stress.

The inventors have identified that the cause of incompatibility, criticized in part by non-presbyopic persons, of the alleged visual stress-reducing or eye fatigue-preventing spectacles lenses lies in the fact that the power of the near portion, designed to reduce near visual stress, of all previously obtainable spectacles lenses is uniformly fixedly determined and not designed for the individual needs of the non-presbyopic persons. Neither the size and shape of the spectacles lens, more particularly the size and shape of the frame, nor the usage conditions under which the non-presbyopic person usually uses the spectacles are included in the design, that is, the geometric configuration, of the spectacles lens.

It should be noted that the term "spectacle lens" should not be understood in the conventional sense merely as amorphous, non-crystalline solid, but as the part of spectacles provided for looking through. A presbyopic person is a person who—usually for age-related reasons—has partly or completely lost the near-range adaptability of the eye by means of accommodation and can therefore no longer without discomfort have sharp vision in the near range without a suitable correction. Thus, a non-presbyopic person has no, or only a small, accommodation deficit. This person is not precluded from having another type of visual defect. In particular, an optician or an ophthalmologist may have prescribed a spherical and/or astigmatic correction to the person. It is also possible for the person to have been prescribed a prismatic correction for correcting a malposition of the eye.

The method according to the invention for making a spectacles lens for a non-presbyopic person comprises the following method steps:

The contour of the ready-to-wear spectacles lens must be provided in a first step. Contour does not necessarily mean that the whole shape of the edge of the spectacles lens is provided. It is also enough, inter alia, to specify the vertical height of the spectacles lens together with the fitting height, from which the final shape of the edge can be determined sufficiently accurately. Ready-to-wear means that the outer edge, that is, the contour, of the spectacles lens no longer changes because it was set into the frame or because, in the case of frameless spectacles, it was completed to attach the nosepiece/earpiece. Here, the spectacles lens need not be present as an object; rather, it suffices to know the dimensions and the outer shape of the spectacles lens. This can be brought about by virtue of the fact that the contour of the spectacles lens is determined from the dimensions of a spectacles frame selected by the person for whom the spectacles are intended and the data established therefrom is provided.

Instead of or in addition to the contour of the ready-to-wear spectacles lens or several thereof, it is possible to provide one or more (fictitious) visual points of the person through the ready-to-wear spectacles lens for one or more visual tasks in the near range. By way of example, the penetration points can be established by virtue of the fact that the person wears their selected frame without spectacles lenses being inserted or with suitable single vision lenses and that the person is requested to observe objects in the near range. One or more usage situations during which the person will conventionally want to use the spectacles are preferably selected. The person can then be photographically recorded, for example with the aid of a camera. The penetration points of the visual rays through the spectacles lens, through which the person looks in the case of the appropriate visual tasks, can then be established with the aid of a suitable image analysis method. Accordingly, all points which are situated on or in the spectacles lens and through which the light emanating from the object passes on the way to the retina are suitable as visual points.

The provided contour and/or the provided visual points are then used to set the place or the position, the extent and/or the optical power (including size and distribution) of the zone on the spectacles lens which should have the envisaged optical power for reducing visual stress. In other words, at least one design reference point of the zone and/or the extent of the zone and/or the optical power within the zone are set. According to DIN EN ISO 13666-5.12, a design reference point is understood to mean the point on a surface of a finished spectacles lens or on the completely processed surface of a spectacles lens semi-finished product in which the intended values of the dioptric power are present according to the specifications of the manufacturer.

On the basis of this information, optionally also taking account of the prescription values, the spectacles lens with the zone with the optical power provided for reducing visual stress is manufactured thereafter.

In the case of the spectacles lens manufactured in this manner, the vertical height of the region of the visual stress-reducing measure for the near range is, on the one hand, not constant as in the case of a conventional spectacles lens with an alleged visual stress-reducing effect, which has a near portion that is independent of the shape of the frame, and, on the other hand, the size of the visual stress-reducing measure for the near range is matched individually to the needs of the spectacles wearer, whereas a spectacles lens with an alleged visual stress-reducing effect, which could be obtained up until this point, always has fixedly prescribed dimensions and a fixedly prescribed power.

As already mentioned above, the optical power provided for visual stress reduction can comprise a prismatic power. According to the invention, provision can be made in this case for at least one of the design reference points to be the prism design reference point for the prismatic power provided for reducing visual stress and for the position of the prism design reference point and/or the extent of the prismatic power and/or the strength of the prismatic power to be fixed individually on the basis of the provided contour and/or the provided visual points. In other words, the convergence-supporting measure is placed individually in the spectacles lens depending on the frame data and the centering data and designed for the individual needs of the user of the spectacles in terms of the extent thereof, in particular the height thereof, and in terms of the optical power thereof. Thus, the advantage of this variant is obvious, namely that of matching the convergence-supporting measure to the needs of the user in an optimal fashion. A visual stress-producing maladjustment or a considerable ineffectiveness of the envisaged visual support is accordingly avoided.

As an alternative to the convergence support, or in addition thereto, it is possible—as likewise already explained above—for the optical power provided for reducing visual stress also to comprise an addition power or an accommodation-supporting power. According to the invention, provision can be made in this case for at least one of the design reference points to be the near design reference point for the addition power provided for reducing visual stress and for the position of the near design reference point and/or the extent of the addition power and/or the strength of the addition power to be fixed individually on the basis of the provided contour and/or the provided visual points. In other words, the accommodation-supporting measure is placed individually in the spectacles lens depending on the frame data and the centering data and designed for the individual needs of the user of the spectacles in terms of the extent thereof, in particular the height thereof, and in terms of the optical power thereof. The advantage of this variant lies in the fact that the accommodation-supporting measure is optimally matched to the needs of the user. A visual stress-producing maladjustment or a considerable ineffectiveness of the envisaged visual support is also avoided in this case.

The spectacles lens according to the invention for a non-presbyopic person comprises at least one zone with an optical power provided for reducing visual stress. The basic principle or concept of the spectacles lens is an afocal or single vision lens, which has a geometric region through which the spectacles wearer looks if the spectacles lens is used as intended, in which geometric region the optical power deviates from zero or from the prescribed spherical and/or toric and/or prismatic power. An afocal lens is provided when the spectacles lens is provided for a person without visual defect. A single vision lens is used if the spectacles wearer has a visual defect. The geometric region or the zone with optical power provided for reducing visual stress is usually embodied as a near portion within the meaning of DIN EN ISO 13666-14.1.3, that is, as a portion of a multifocal or progressive power spectacles lens provided for near-range vision. According to the invention, at least one design reference point of the zone and/or the extent of the zone and/or the optical power within the zone is matched individually to the contour of the ready-to-wear spectacles lens and/or one or more visual points of the corresponding person through the ready-to-wear spectacles lens for one or more visual tasks in the near range.

In the case of a spectacles lens in which the optical power provided for reducing visual stress comprises a prismatic power or effect, the invention provides the option of at least one of the design reference points being the prism design reference point for the prismatic power provided for reducing visual stress and of the position of the prism design reference point and/or the extent of the prismatic power and/or the strength of the prismatic power being fixed individually on the basis of the provided contour and/or the provided visual points. This spectacles lens is distinguished by virtue of the fact that the convergence-supporting measure is optimally matched to the needs of the user. A visual stress-producing maladjustment of the spectacle lens or a considerable ineffectiveness of the envisaged visual support is dispensed with.

A spectacles lens which, in addition to the convergence support by means of a near prism, or as an alternative thereto, comprises addition power to reduce visual stress can, according to the invention, be designed such that at least one of the design reference points is the near design reference point for the addition power provided for reducing visual stress and that the position of the near design reference point and/or the extent of the addition power and/or the strength of the addition power is fixed individually on the basis of the provided contour and/or the provided visual points. This spectacles lens is distinguished by virtue of the fact that the accommodation-supporting power is optimally matched to the needs of the user. A visual stress-producing maladjustment of the spectacles lens or a considerable ineffectiveness of the envisaged visual support is precluded.

Accordingly, a spectacles lens family of the type according to the invention comprises a plurality of spectacles lenses for non-presbyopic persons, the visual stress-reducing effect of which lenses is optimally matched to the respective needs of the users wearing the spectacles lenses. The spectacles lens family according to the invention comprises a plurality of spectacles lenses for non-presbyopic persons, wherein each spectacles lens has at least one zone with an optical power provided for reducing visual stress and wherein, in each spectacles lens of the spectacles lens family, at least one design reference point of the zone and/or the extent of the zone and/or the optical power within the zone depends on the contour of the particular ready-to-wear spectacles lens and/or on one or more visual points of the corresponding person through the particular ready-to-wear spectacles lens for one or more visual tasks in the near range.

The invention furthermore relates to a computer program with program code for carrying out the above-described method when the computer program is executed on a computer. The computer program can be stored on a machine-readable data medium.

Finally, the invention relates to a computer which is designed to execute the above-described method according to the invention.

BRIEF DESCRIPTION OF THE DRAWINGS

The invention will now be described with reference to the drawings wherein:

FIGS. 2A to 2C show how penetration points for visual rays are established for different visual tasks, namely:

FIG. 2A shows how the penetration point for visual rays is established for reading and writing;

FIG. 2B shows how the penetration point for visual rays is established for working in front of a screen; and, FIG. 2C shows how the penetration point for visual rays is established for mechanical assembly;

FIGS. 3A to 3C show the exemplary arrangement of the design reference points in the case of a spectacles lens with a circular external contour, which is produced according to the method according to FIGS. 1A and 1B, when the visual stress-reducing measure is provided for the following preferred usage situation:

FIG. 3A shows the usage situation of reading and writing;

FIG. 3B shows the usage situation of working in front of a screen; and,

FIG. 3C shows the usage situation of mechanical assembly;

FIG. 4A shows the usage situation of reading and writing;

FIG. 4B shows the usage situation of working in front of a screen; and,

FIG. 4C shows the usage situation of mechanical assembly; and,

DESCRIPTION OF THE PREFERRED EMBODIMENTS OF THE INVENTION

Figure 1A:
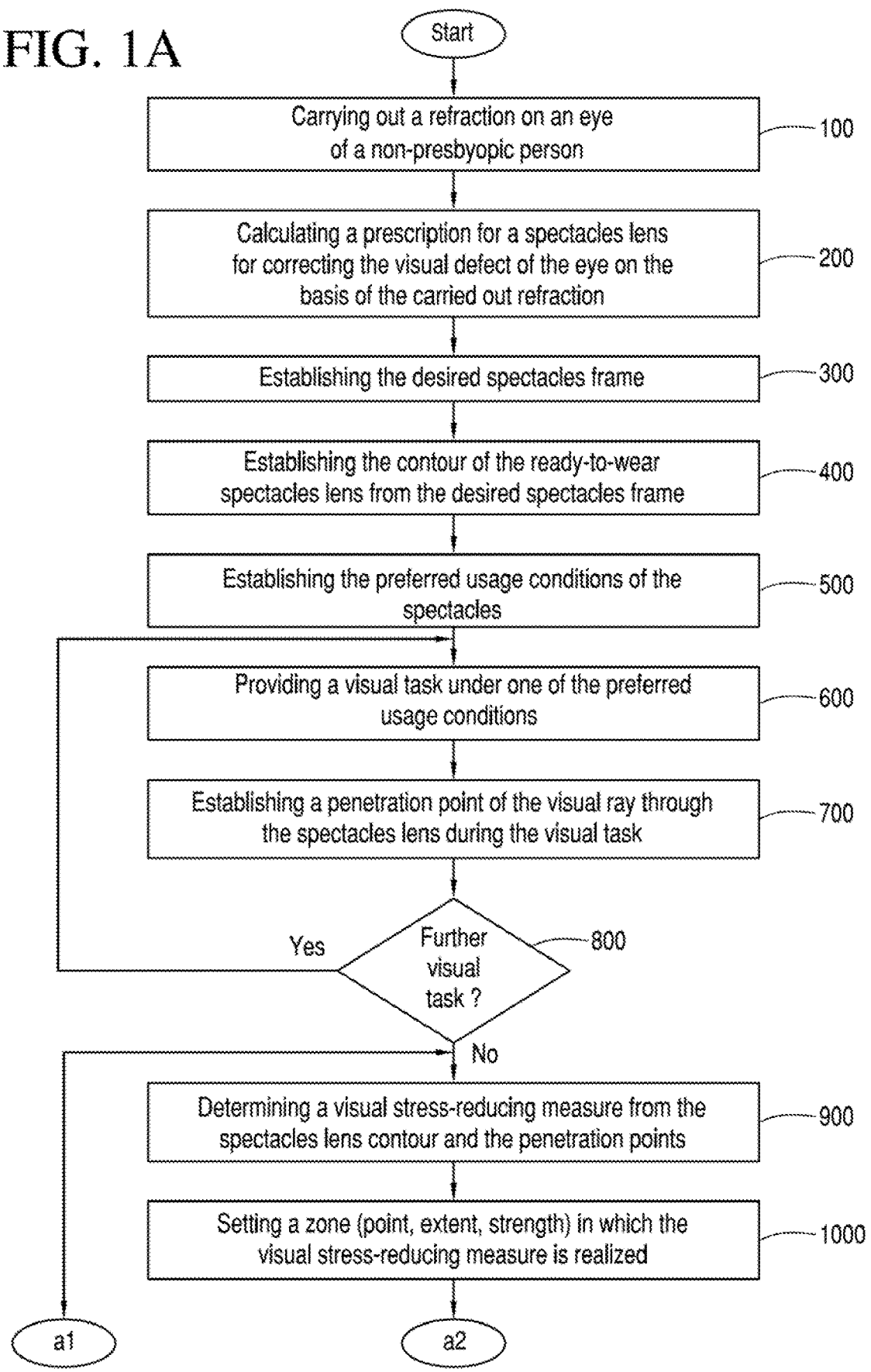
FIGS. 1A and 1B show an exemplary embodiment of a method according to the invention for producing a spectacles lens for a non-presbyopic person, which spectacles lens has at least one zone with optical power provided for reducing visual stress.
Figure 1B:
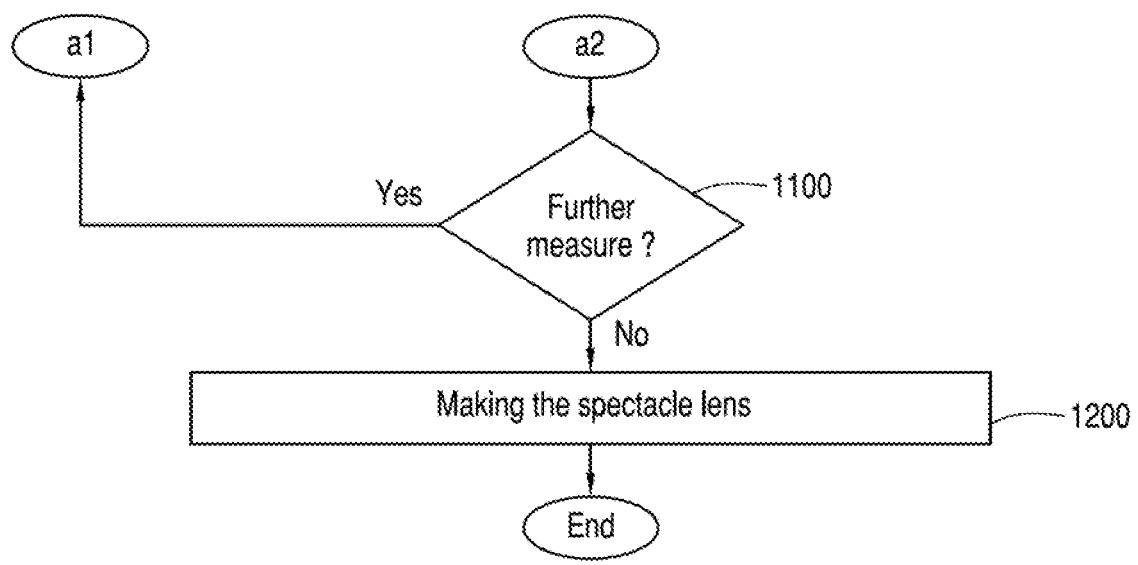

FIGS. 1A and 1B show an exemplary embodiment for a method according to the invention for producing a spectacles lens for a non-presbyopic person. The spectacles lens has at least one zone with optical power or effect provided for reducing visual stress.

In a first step 100—to the extent that this appears necessary—it is possible to carry out a refraction measurement on one or both eyes of the non-presbyopic person. In optometry and ophthalmology, the term (axial) refraction (Latin, re=back, frangere=break) denotes the power of the optical correction, together with which a specific eye without accommodation generates a sharp image of an object at infinity. This is referred to as normal vision or emmetropia if this value is zero; otherwise, this is referred to as a refractive error.

A distinction should be made between objective refraction, which is measured by means of an apparatus arrangement, and subjective refraction, which requires information from the examined patient in respect of the perceived image sharpness.

The measurement values established when the refraction is carried out are, in a further step 200, transferred to a so-called prescription, which serves to enable the optician to make the spectacles lenses. Near sightedness and far sightedness are corrected by so-called spherical spectacles lenses; astigmatism is corrected by cylindrical spectacles lenses. Moreover, a malposition of one or both eyes may make a prismatic correction necessary.

In a further step 300, the spectacles wearer, preferably supported by the optician, selects a suitable spectacles frame. Here, the term spectacles frame can be understood in a very broad sense. It can also include so-called frameless spectacles designs, in which the spectacles lenses are merely interconnected by a nosepiece and the earpieces or the band across the back of the head are attached directly to the spectacles lenses.

Depending on the selected spectacles frame, the outer contour of the ready-to-wear spectacles lens can emerge directly from the shape of the frame. In the case of frameless spectacles designs, the spectacles wearer is still able, within certain boundaries, to predefine the external contour. An object of the subsequent step 400 is to establish this contour of the ready-to-wear spectacles lens from the desired spectacles frame.

In a further method step 500, the preferred usage conditions, under which the future spectacles wearer intends to wear the spectacles, is thereupon determined. This is important because the regions of the spectacles lens, through which the spectacles wearer will look with a very high probability, emerge from this. This method step 500 can precede the selection of the spectacles frame (step 300) because certain frame types are not suitable for the planned wearing conditions since these restrict the field of vision in an unacceptable manner. It is also possible that the future spectacles wearer wishes to use the spectacles not only for a single specific purpose, but rather for various activities. In this case, a plurality of usage conditions are determined and optionally weighted with respect to the expected frequency.

In a further step 600, the future spectacles wearer is confronted with a visual task which is typical for the selected usage conditions. By way of example, this can be brought about by virtue of the subject wearing their selected frame in the usual usage position, without inserted spectacles lenses, and reading a newspaper. In doing so, the subject's face is recorded by a camera. The camera recording is then used to establish, with the aid of a suitable image evaluation program, the position of the pupils relative to the frame. From this, it is then possible to reconstruct the path of the visual ray from the object to the eye through the frame. A penetration point of the visual ray through the spectacles lens can then be derived in a further step 700. Here, the term penetration point should be understood in a broad sense as a point on the front side or back side of the spectacles lens itself or within the spectacles lens itself, the spectacles lens being imagined to have been inserted into the frame, and through which point the visual ray passes for the particular visual task. The invention optionally provides for a plurality of visual tasks to be examined, and for the respective penetration points to be established to the extent that this is wanted or required (step 800).

Figure 2A:
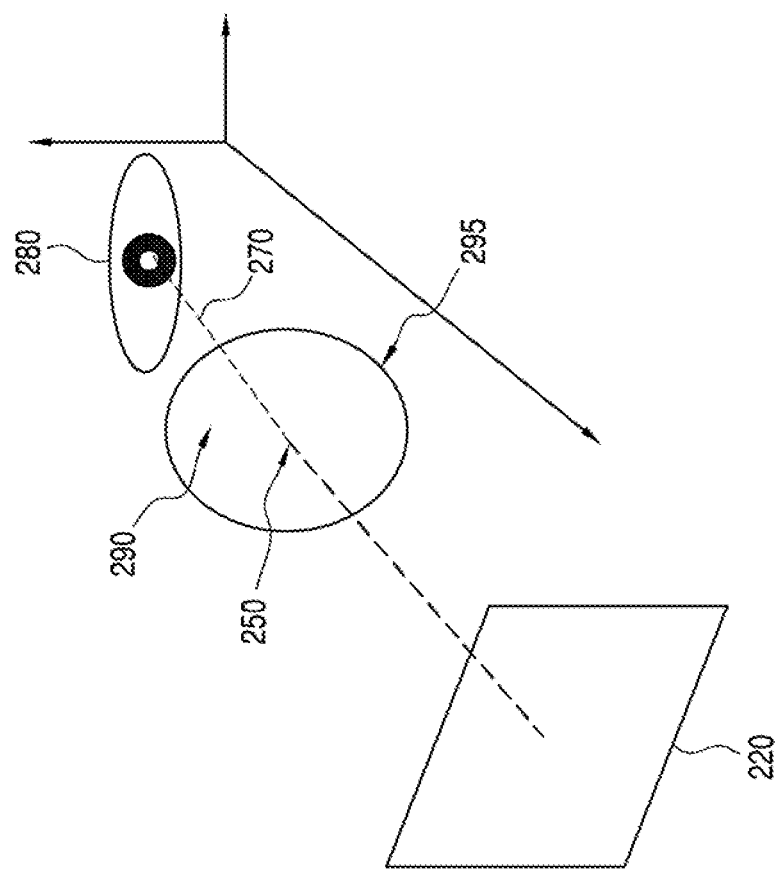
Figure 2B:
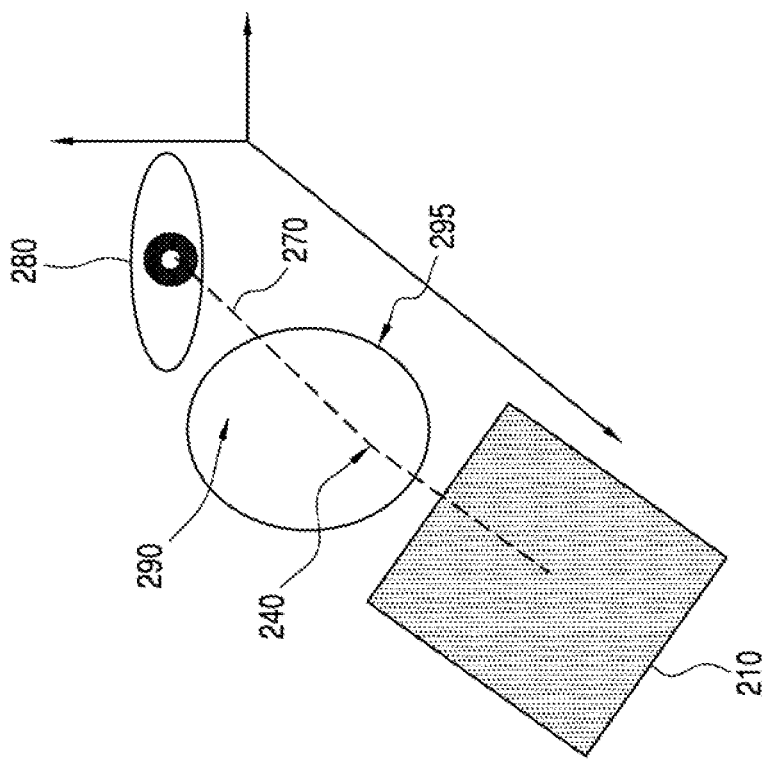

FIGS. 2A to 2C show, in an exemplary fashion, the establishment of penetration points for visual rays in the case of different visual tasks, such as reading or writing (FIG. 2A), working in front of a screen (FIG. 2B) and mechanical assembly (FIG. 2C), in the case of a spectacles lens 290 with a circular contour 295.

In a first step, the object to be used is brought into the correspondingly comfortable position for the user. This object is a sheet of paper or a newspaper 210 in FIG. 2A; a screen 220 in FIG. 2B or an assembly wall 230 in FIG. 2C. In a second step, the position of the corresponding penetration point (240, 250, 260), through the spectacles lens 290, of the visual ray 270 from the eye 280 of the user to the object (210, 220, 230) is determined, for example as described above.

Depending on the specified task (FIGS. 2A, 2B and 2C) and the distance of the object (210, 220, 230) from the eye 280, this penetration point (240, 250, 260) is situated higher or lower in the spectacles lens 290. The lower the selected task is with respect to the eye level, the lower the penetration point (240, 250, 260) is situated in the spectacles lens 290. The higher the selected task is with respect to the eye level, the higher the penetration point (240, 250, 260) is situated in the spectacles lens 290.

From the one or optionally more established penetration points (240, 250, 260) and from the contour 295 of the spectacles lens 290, it is possible to derive the suitable measure(s) for reducing visual stress (step 900). In principle, accommodation-supporting measures or convergence-supporting measures or both can be considered.

Then, in a further step 1000, one or more (query 1100) zones are set, in which the visual stress-reducing measure(s) is/are realized. In particular, it is possible to prescribe the point, the extent and the strength of the optical power for reducing visual stress.

The following text uses FIGS. 3A, 3B, 3C, 4A, 4B and 4C to explain, in an exemplary fashion, how the zones and the visual stress-reducing measures are set for different visual tasks and for different frame shapes. From FIGS. 3A to 3C, it is possible to gather the path of the visual ray 270 from the eye 280 to the object (210, 220, 230) for the spectacles lens 290 illustrated in FIGS. 2A to 2C with a circular frame shape 295. As already explained above, the particular penetration point is higher or lower in the spectacles lens 290 depending on the specified task and distance of the object (210, 220, 230) from the eye 280. Likewise, the required accommodation-supporting and/or convergence-supporting measure is greater or smaller depending on the specified task and distance of the object (210, 220, 230) from the eye 280. The lower the selected task is with respect to the eye level, the lower the penetration point is situated in the spectacles lens 290. The higher the selected task is with respect to the eye level, the higher the penetration point is situated in the spectacles lens 290. The closer the object (210, 220, 230) is to the eye 280, the greater the required accommodation-supporting and/or convergence-supporting measure is and the further away the object (210, 220, 230) is from the eye, the lesser the required accommodation-supporting and/or convergence-supporting measure is.

Figure 3B:
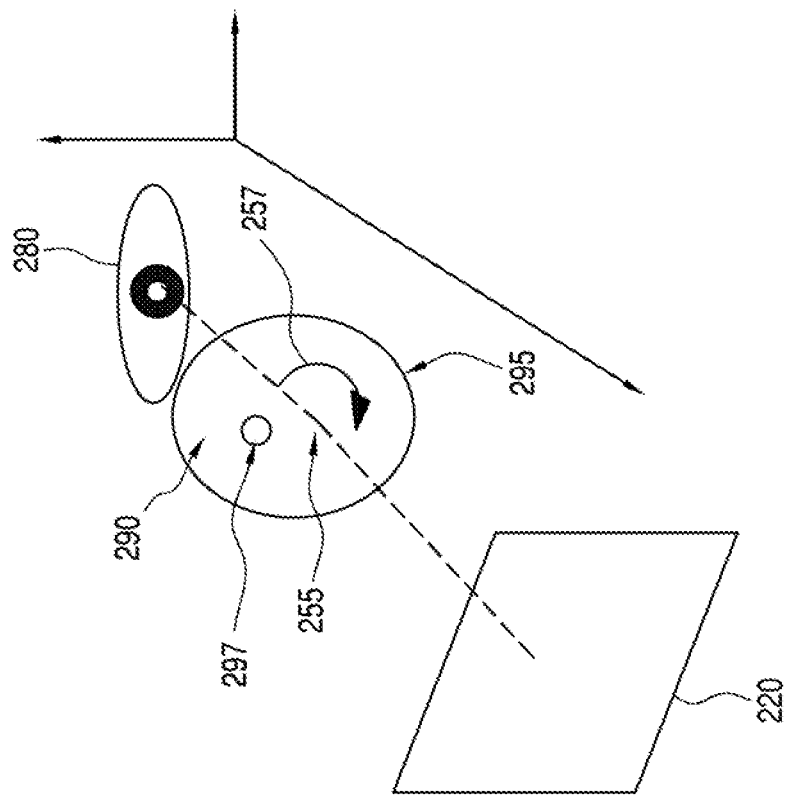
Figure 3A:
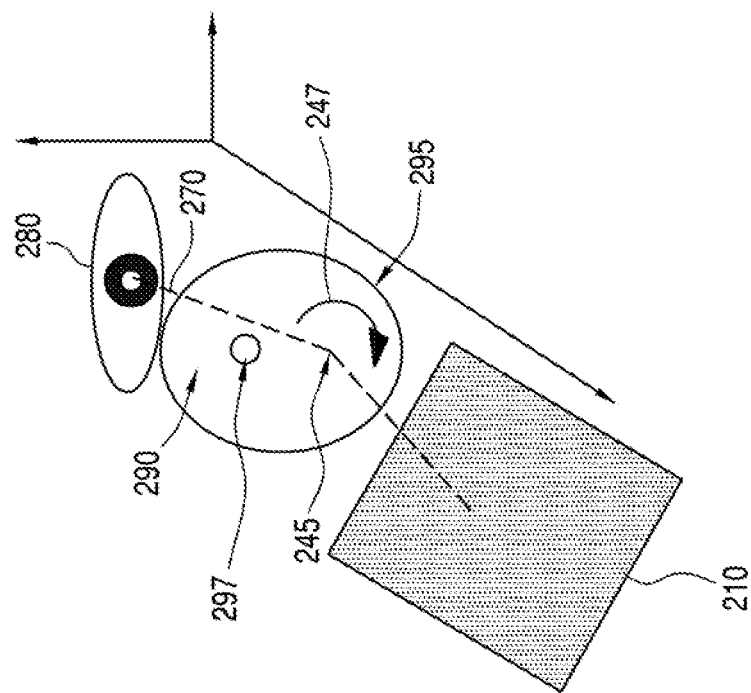

In the visual task (reading, writing) illustrated in FIG. 3A, the observed object 210 is comparatively close to the eye 280, specifically at a distance of approximately 30 to 40 cm from the latter. The sheet of paper during writing and the newspaper during reading are held in a comparatively low position. The established penetration point (denoted by reference sign 240 in FIG. 2A) of the visual ray 270 through the spectacles lens 290, which is circular in this case, lies comparatively low down, that is, far below the distance design reference point 297 which, pursuant to DIN EN ISO 13666-5.15, is the point on the front surface on a spectacles lens in which the dioptric power for the distance portion must be achieved.

In the example according to FIG. 3A, the assumption is made that the design reference point 245 for the two visual stress-reducing measures discussed here, namely the accommodation-supporting and the convergence-supporting measures, is identical to the visual point 240 for the specified visual task and situated on the front side of the lens surface. In principle, these points 245 could also be selected deviating from this rule, namely, for example, spatially separated from one another and/or on the back side of the spectacles lens. Accordingly, in the present exemplary embodiment, the design reference point 245 for the visual stress-reducing measure constitutes the point on the front surface of the spectacles lens 290 at which the dioptric power for the accommodation-supporting and the convergence-supporting measures must be achieved. This design reference point 245 must lie within the contour of the ready-to-wear spectacles lens 290. Since the newspaper or the sheet 210 is arranged very closely to the eye 280 of the observer, the accommodation-supporting and convergence-supporting measures (indicated by a directional arrow 247) must have a comparatively high optical power. Moreover, the extent of the zone in which the convergence-supporting and accommodation-supporting measures should act must be comparatively large. In this case, typical values for a prismatic power of the accommodation-supporting measures are 0.25 cm/m to 3 cm/m basis inside per eye. Here, typical values for an addition power of the accommodation-supporting measure are 0.25 dpt to 1.00 dpt. The extent of the zone within which the convergence-supporting and accommodation-supporting measures act depends on the design rules fixed by the optics designer. It can be a few millimeters in diameter or else comprise one or more centimeters.

In the visual task illustrated in FIG. 3B (on-screen work), the observed object, that is, the screen 220, is at a similar distance as in the visual task according to FIG. 3A, namely at a distance of approximately 50 to 80 cm from the eye 280 of the observer. In the case where the spectacles are only used for on-screen work, the design reference point 255 for the convergence-supporting and accommodation-supporting measures can in turn be selected to be identical to the visual point 250 for this visual task. If the spectacles were to be used for both on-screen work and for reading and writing, it would also be possible to select a point (preferably on the front side of the spectacles lens) arranged between the visual point for reading/writing and the visual point for observing the screen. Different design reference points can also be selected for the convergence-supporting and accommodation-supporting measures. Finally, it is also possible that the visual stress-reducing measures for reading/writing, on the one hand, and the on-screen work, on the other hand, are selected to be spatially separated and/or to have a different strength in terms of power and/or to have a different size in terms of extent. As already indicated above, typical zone diameters for the visual stress-reducing measures are design-dependent in the case of FIG. 3B. A possible prismatic power for the convergence-supporting measure can once again assume values between 0.25 cm/m and 3 cm/m. A possibly utilized addition power of the accommodation-supporting measure lies at approximately 0.25 dpt to 1.0 dpt. The optical power (prism and addition power) of the visual stress-reducing measures is identified in FIG. 3B by the directional arrow 257.

In the visual task (assembly) illustrated in FIG. 3C, the observed object 230 lies at a distance of 30 to 40 cm from the eye 280 of the observer, but level with the eye 280. For this case, the design reference point 265 for the visual stress-reducing measure can likewise be selected to be identical to the visual point 260. For this visual task, the typical prismatic power for the convergence-supporting measure lies at approximately 0.25 cm/m to 3 cm/m, the typical addition power at approximately 0.25 dpt to 1.0 dpt and the zone diameter is also dependent on the design in this case. The optical power (prism and addition power) of the visual stress-reducing measure is identified in FIG. 3C by the directional arrow 267.

Figure 4A:
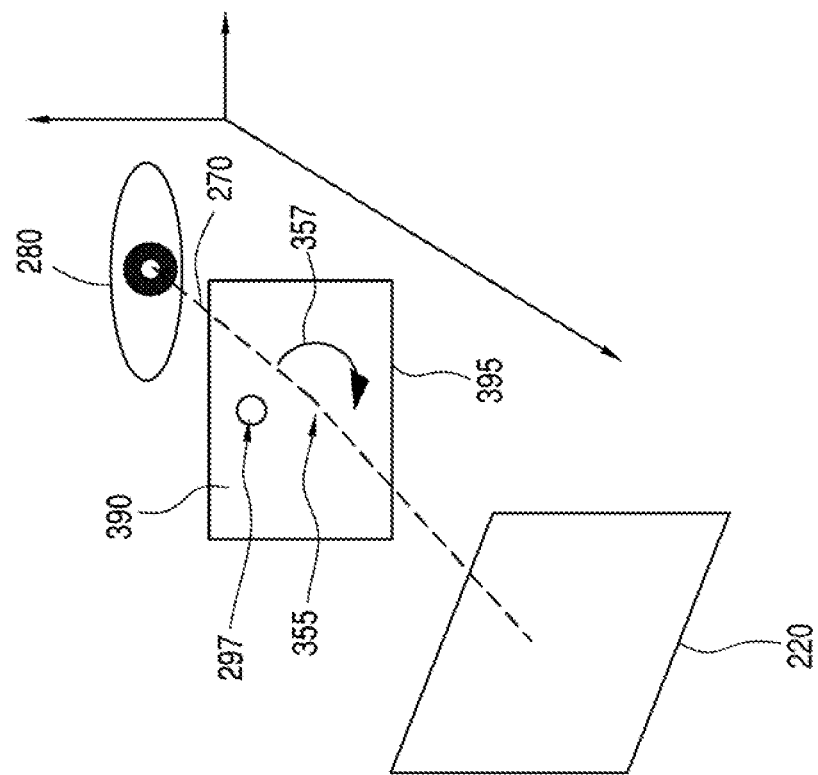
FIGS. 4A to 4C show the exemplary arrangement of the design reference points in the case of a spectacles lens with a rectangular external contour, which is produced according to the method according to FIGS. 1A and 1B, when the visual stress-reducing measure is provided for the following preferred usage situation.
Figure 4B:
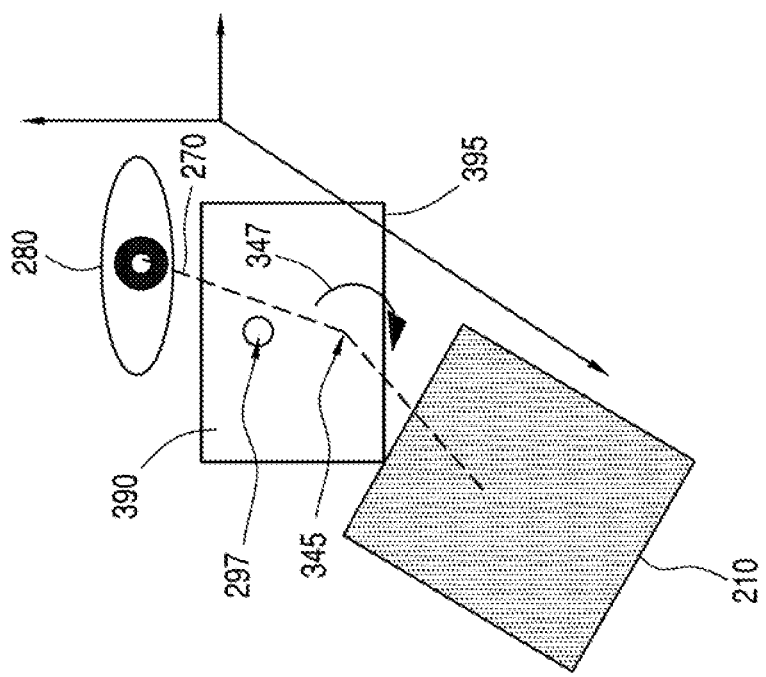
Figure 4C:
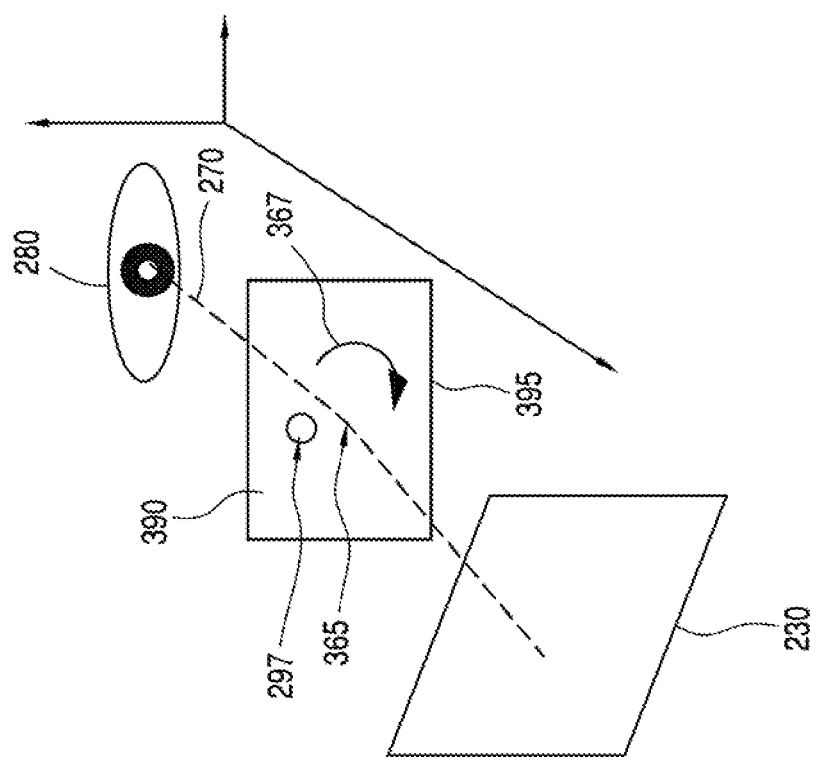

Depending on the contour of the spectacles lens shape, or depending on the height of the contour, it is necessary to position the design reference point or the zone of the accommodation-supporting and/or convergence-supporting measures in the spectacles lens 290 such that, on the one hand, it corresponds to the circumstances of the activity but, on the other hand, also still lies within the frame contour 295. Compared to FIGS. 3A to 3C, FIGS. 4A to 4C show the corresponding characteristics, namely the design reference points (345, 355, 365) and the strengths of the visual stress-reducing measures (347, 357, 367), for the case of a spectacles lens 390 with a rectangular frame shape 395 for the same usage conditions reading/writing (FIG. 4A), on-screen work (FIG. 4B) and assembly (FIG. 4C).

Figure 5:
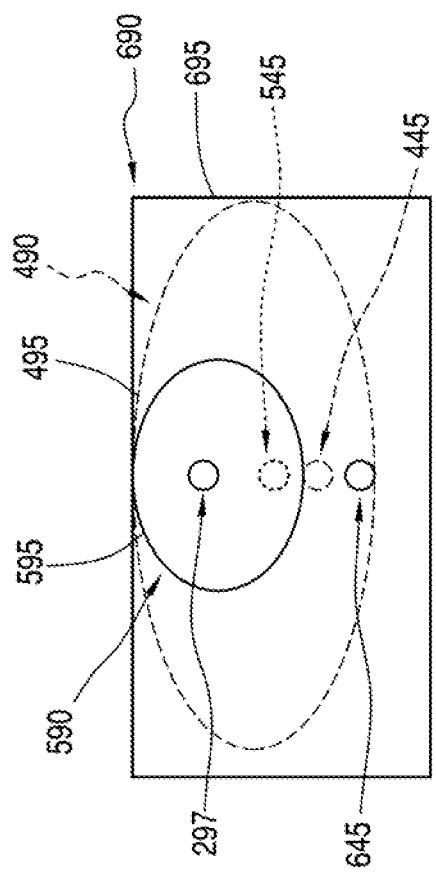
FIG. 5 shows a comparison of different frame shapes and positions of the design reference points resulting therefrom.

FIG. 5 shows the decisive design reference points (445, 545, 645) for the visual task reading/writing as an overview for spectacles lenses (490, 590) with different dimensions but similar elliptical contour (495, 595) and a spectacles lens 690 with a rectangular shape 695.

A spectacles lens of the type according to the invention can then be made (step 1200) on the basis of the above-described design reference points and other data conventional for calculating spectacles lenses, such as refraction, material and usage conditions.

It is understood that the foregoing description is that of the preferred embodiments of the invention and that various changes and modifications may be made thereto without departing from the spirit and scope of the invention as defined in the appended claims.

What is claimed is:

1. A method for making a spectacle lens being designed for an individual need of a non-presbyopic person wherein the spectacle lens is a ready-to-wear spectacle lens and has at least one zone having an optical power provided to reduce vision stress, the method comprising the steps of:
   first, providing data representing at least one pre-determined visual point with the data representing a situation wherein the person looks through said ready-to-wear spectacle lens at said visual point for one or several tasks in the near range;
   second, individually setting one of: (i) a design reference point of the zone; (ii) the design reference point of the zone and an extent of the zone; (iii) the design reference point of the zone and the optical power within the zone; and, (iv) the design reference point of the zone and the extent of the zone and the optical power within the zone, the individual setting being based on the data of the at least one pre-determined visual point;
   third, deriving said zone as a non-prescription non-zero optical power of at least a sufficient optical power that reduces visual stress caused by one of the following: an eye accommodation and convergence via at least one of an accommodation-supporting measure and a convergence-supporting measure; and,
   wherein the optical power provided for reducing vision stress includes a near-range addition power;
   wherein the individually set design reference point is the near-range design reference point for the near-range addition power provided for reducing vision stress; and,
   wherein at least one of the following steps is performed:
   (i) the position of the near-range design reference point is individually set based on the at least one visual point;
   (ii) the extent of the near-range addition power is individually set based on the at least one visual point; and,
   (iii) the intensity of the near-range addition power is individually set based on the at least one visual point.

2. A method for making a spectacle lens being designed for an individual need of a non-presbyopic person wherein the spectacle lens is a ready-to-wear spectacle lens and has at least one zone having an optical power provided to reduce vision stress, the method comprising the steps of:
   providing data representing at least one pre-determined visual point with the data representing a situation wherein the person looks through said ready-to-wear spectacle lens at said visual point for one or several tasks in the near range;
   individually setting at least one design reference point of the zone, and additionally optionally setting one of: the extent of the zone, and the optical power within the zone, the individual setting being based on the data of the at least one pre-determined visual point;
   deriving said zone as a non-prescription non-zero optical power of at least a sufficient optical power that reduces visual stress caused by one of the following: an eye accommodation and convergence via at least one of an accommodation-supporting measure and a convergence-supporting measure; and,
   wherein the optical power provided for reducing vision stress includes a near-range addition power;
   wherein at least one of the design reference points has been individually set and is the near-range design reference point for the near-range addition power provided for reducing vision stress; and,
   wherein at least one of the following steps is performed:
   (i) the position of the near-range design reference point is individually set based on the at least one visual point;
   (ii) the extent of the near-range addition power is individually set based on the at least one visual point;
   (iii) the intensity of the near-range addition power is individually set based on the at least one visual point; and,
   wherein the reduction of vision stress further includes a prismatic power; and, wherein at least one of the design reference points is the prism design reference point for the prismatic power for reducing vision stress and the position of the prism design reference point and/or the extent of the prismatic power and/or the intensity of the prismatic power is individually set based on the contour of the spectacle lens and/or at least one visual point.

3. The method of claim 2, wherein reduction of vision stress further includes said near-range addition power; and, wherein at least one of the design reference points is the near-range design reference point for the near-range addition power provided for reducing vision stress; and, the position of the near-range design reference point and/or the extent of the near-range addition power and/or the intensity of the near-range addition power is further individually set based on the contour of the spectacle lens and/or at least one visual point.

4. A computer for carrying out a method for making a spectacle lens being designed for an individual need of a non-presbyopic person wherein the spectacle lens is a ready-to-wear spectacle lens and has at least one zone having an optical power provided to reduce vision stress, the method including the steps of:
   first, providing data representing at least one pre-determined visual point with the data representing a situation wherein the person looks through said ready-to-wear spectacle lens at said visual point for one or several tasks in the near range;
   second, individually setting one of: (i) a design reference point of the zone; (ii) the design reference point of the zone and an extent of the zone; (iii) the design reference point of the zone and the optical power within the zone; and, (iv) the design reference point of the zone and the extent of the zone and the optical power within the zone, the individual setting being based on the data of the at least one pre-determined visual point;
   third, deriving said zone as a non-prescription non-zero optical power of at least a sufficient optical power that reduces visual stress caused by one of the following: an eye accommodation and convergence via at least one of an accommodation-supporting measure and a convergence-supporting measure; and,
   wherein the optical power provided for reducing vision stress includes a near-range addition power;
   wherein the individually set design reference point is the near-range design reference point for the near-range addition power provided for reducing vision stress;
   wherein at least one of the following steps is performed:
   (i) the position of the near-range design reference point is individually set based on the at least one visual point;
   (ii) the extent of the near-range addition power is individually set based on the at least one visual point; and,
   (iii) the intensity of the near-range addition power is individually set based on the at least one visual point.

5. A computer program comprising a program code stored on a non-transitory computer-readable medium, the program code being for making a spectacle lens being designed for an individual need of a non-presbyopic person wherein the spectacle lens is a ready-to-wear spectacle lens and has at least one zone having an optical power provided to reduce vision stress, said program code being configured, when executed by a processor, to:
   first, provide data representing at least one pre-determined visual point with the data representing a situation wherein the person looks through said ready-to-wear spectacle lens at said visual point for one or several tasks in the near range;
   second, individually set one of: (i) a design reference point of the zone; (ii) an extent of the zone; (iii) the design reference point of the zone and the optical power within the zone; and, (iv) the design reference point of the zone and the extent of the zone and the optical power within the zone, the individual setting being based on the data of the at least one pre-determined visual point;
   third, derive said zone as a non-prescription non-zero optical power of at least a sufficient optical power that reduces visual stress caused by one of the following: an eye accommodation and convergence via at least one of an accommodation-supporting measure and a convergence-supporting measure;
   wherein the optical power provided for reducing vision stress includes a near-range addition power; and, wherein the individually set design reference point is the near-range design reference point for the near-range addition power provided for reducing vision stress; and, wherein at least one of the following steps is performed:
   (i) the position of the near-range design reference point is individually set based on the at least one visual point;
   (ii) the extent of the near-range addition power is individually set based on the at least one visual point; and,
   (iii) the intensity of the near-range addition power is individually set based on the at least one visual point.

6. A method for designing a spectacle lens for an individual need of a non-presbyopic person wherein the spectacle lens is a ready-to-wear spectacle lens and has at least one zone having an optical power provided to reduce vision stress, the method comprising the steps of:
   first, providing data representing at least one pre-determined visual point with the data representing a situation wherein the person looks through said ready-to-wear spectacle lens at said visual point for one or several tasks in the near range;
   second, individually setting one of: (i) a design reference point of the zone; (ii) the design reference point of the zone and an extent of the zone; (iii) the design reference point of the zone and the optical power within the zone; and, (iv) the design reference point of the zone and the extent of the zone and the optical power within the zone, the individual setting being based on the data of the at least one pre-determined visual point;
   third, deriving said zone as a non-prescription non-zero optical power of at least a sufficient optical power that reduces visual stress caused by one of the following: an eye accommodation and convergence via at least one of an accommodation-supporting measure and a convergence-supporting measure; and,
   wherein the optical power provided for reducing vision stress includes a near-range addition power;
   wherein the individually set design reference point is the near-range design reference point for the near-range addition power provided for reducing vision stress; and,
   wherein at least one of the following steps is performed:
   (i) the position of the near-range design reference point is individually set based on the at least one visual point;
   (ii) the extent of the near-range addition power is individually set based on the at least one visual point; and,
   (iii) the intensity of the near-range addition power is individually set based on the at least one visual point.

7. A method for designing a spectacle lens for an individual need of a non-presbyopic person wherein the spectacle lens is a ready-to-wear spectacle lens and has at least one zone having an optical power provided to reduce vision stress, the method comprising the steps of:
   providing data representing at least one pre-determined visual point with the data representing a situation wherein the person looks through said ready-to-wear spectacle lens at said visual point for one or several tasks in the near range;
   individually setting at least one design reference point of the zone, and additionally setting one of: the extent of the zone, and the optical power within the zone, the individual setting being based on the data of the at least one pre-determined visual point;
   deriving said zone as a non-prescription non-zero optical power of at least a sufficient optical power that reduces visual stress caused by one of the following: an eye accommodation and convergence via at least one of an accommodation-supporting measure and a convergence-supporting measure; and, wherein the optical power provided for reducing vision stress includes a near-range addition power;

wherein at least one of the design reference points has been individually set and is the near-range design reference point for the near-range addition power provided for reducing vision stress; and, wherein at least one of the following steps is performed:
(i) the position of the near-range design reference point is individually set based on the at least one visual point;
(ii) the extent of the near-range addition power is individually set based on the at least one visual point;
(iii) the intensity of the near-range addition power is individually set based on the at least one visual point; and, wherein the reduction of vision stress further includes a prismatic power; and, wherein at least one of the design reference points is the prism design reference point for the prismatic power for reducing vision stress and the position of the prism design reference point and/or the extent of the prismatic power and/or the intensity of the prismatic power is individually set based on the contour of the spectacle lens and/or at least one visual point.

8. The method of claim 7, wherein reduction of vision stress includes the near-range addition power; and, wherein at least one of the design reference points is the near-range design reference point for the near-range addition power provided for reducing vision stress; and, the position of the near-range design reference point and/or the extent of the near-range addition power and/or the intensity of the near-range addition power is further individually set based on the contour of the spectacle lens and/or at least one visual point.

9. A computer for carrying out a method for designing a spectacle lens being designed for an individual need of a non-presbyopic person wherein the spectacle lens is a ready-to-wear spectacle lens and has at least one zone having an optical power provided to reduce vision stress, the method including the steps of:

first, providing data representing at least one pre-determined visual point with the data representing a situation wherein the person looks through said ready-to-wear spectacle lens at said visual point for one or several tasks in the near range;

second, individually setting one of: (i) a design reference point of the zone; (ii) the design reference point of the zone and an extent of the zone; (iii) the design reference point of the zone and the optical power within the zone; and, (iv) the design reference point of the zone and the extent of the zone and the optical power within the zone, the individual setting being based on the data of the at least one pre-determined visual point;

third, deriving said zone as a non-prescription non-zero optical power of at least a sufficient optical power that reduces visual stress caused by one of the following: an eye accommodation and convergence via at least one of an accommodation-supporting measure and a convergence-supporting measure; and, wherein the optical power provided for reducing vision stress includes a near-range addition power;

wherein the individually set design reference point is the near-range design reference point for the near-range addition power provided for reducing vision stress;

wherein at least one of the following steps is performed:
(i) the position of the near-range design reference point is individually set based on the at least one visual point;
(ii) the extent of the near-range addition power is individually set based on the at least one visual point; and,
(iii) the intensity of the near-range addition power is individually set based on the at least one visual point.

10. A computer program comprising a program code stored on a non-transitory computer-readable medium, the program code being for designing a spectacle lens for an individual need of a non-presbyopic person wherein the spectacle lens is a ready-to-wear spectacle lens and has at least one zone having an optical power provided to reduce vision stress, said program code being configured, when executed by a processor, to:

first, provide data representing at least one pre-determined visual point with the data representing a situation wherein the person looks through said ready-to-wear spectacle lens at said visual point for one or several tasks in the near range;

second, individually set one of: (i) a design reference point of the zone; (ii) the design reference point of the zone and an extent of the zone; (iii) the design reference point of the zone and the optical power within the zone; and, (iv) the design reference point of the zone and the extent of the zone and the optical power within the zone, the individual setting being based on the data of the at least one pre-determined visual point;

third, derive said zone as a non-prescription non-zero optical power of at least a sufficient optical power that reduces visual stress caused by one of the following: an eye accommodation and convergence via at least one of an accommodation-supporting measure and a convergence-supporting measure;

wherein the optical power provided for reducing vision stress includes a near-range addition power; and, wherein the individually set design reference point is the near-range design reference point for the near-range addition power provided for reducing vision stress; and, wherein at least one of the following steps is performed:
(i) the position of the near-range design reference point is individually set based on the at least one visual point;
(ii) the extent of the near-range addition power is individually set based on the at least one visual point; and,
(iii) the intensity of the near-range addition power is individually set based on the at least one visual point.

* * * * *